United States Patent [19]

Souza et al.

[11] 4,245,423
[45] Jan. 20, 1981

[54] ANIMAL TRAP

[75] Inventors: Anthony J. Souza; Joseph H. Bumsted, both of Lancaster, Pa.

[73] Assignee: Woodstream Corporation, Lititz, Pa.

[21] Appl. No.: 965,477

[22] Filed: Dec. 1, 1978

[51] Int. Cl.³ ............................................ A01M 23/30
[52] U.S. Cl. .................................................... 43/81
[58] Field of Search ................... 43/81, 81.5, 82, 83, 43/83.5

[56] References Cited

U.S. PATENT DOCUMENTS

| 640,980 | 1/1900 | Williams | 43/81 |
| 1,791,172 | 2/1931 | Suhr | 43/81 |
| 2,373,068 | 4/1945 | Turpan | 43/81 |
| 2,475,884 | 7/1949 | Fitzsimons | 43/81 |
| 2,574,322 | 11/1951 | Fitzsimons | 43/81 |
| 4,127,960 | 12/1978 | Conibear | 43/88 |

FOREIGN PATENT DOCUMENTS

| 1125712 | 3/1962 | Fed. Rep. of Germany | 43/81 |
| 222272 | 10/1924 | United Kingdom | 43/81 |
| 873008 | 7/1961 | United Kingdom | 43/81 |

Primary Examiner—Nicholas P. Godici
Attorney, Agent, or Firm—Holman & Stern

[57] ABSTRACT

A conventional form of mouse trap having a U-shaped sprung jaw pivotally mounted on a baseboard is provided with a novel form of pivotal bait pedal forming part of the trigger mechanism of the trap. The bait pedal molded in plastic, has a snap-on mounting arrangement for pivotally attaching same on the baseboard and has a system whereby the sensitivity of the trigger mechanism can be adjusted. Preferably the pedal has a size and shape to cover substantially the entire area enclosed by the trap jaw.

9 Claims, 5 Drawing Figures

U.S. Patent  Jan. 20, 1981  4,245,423
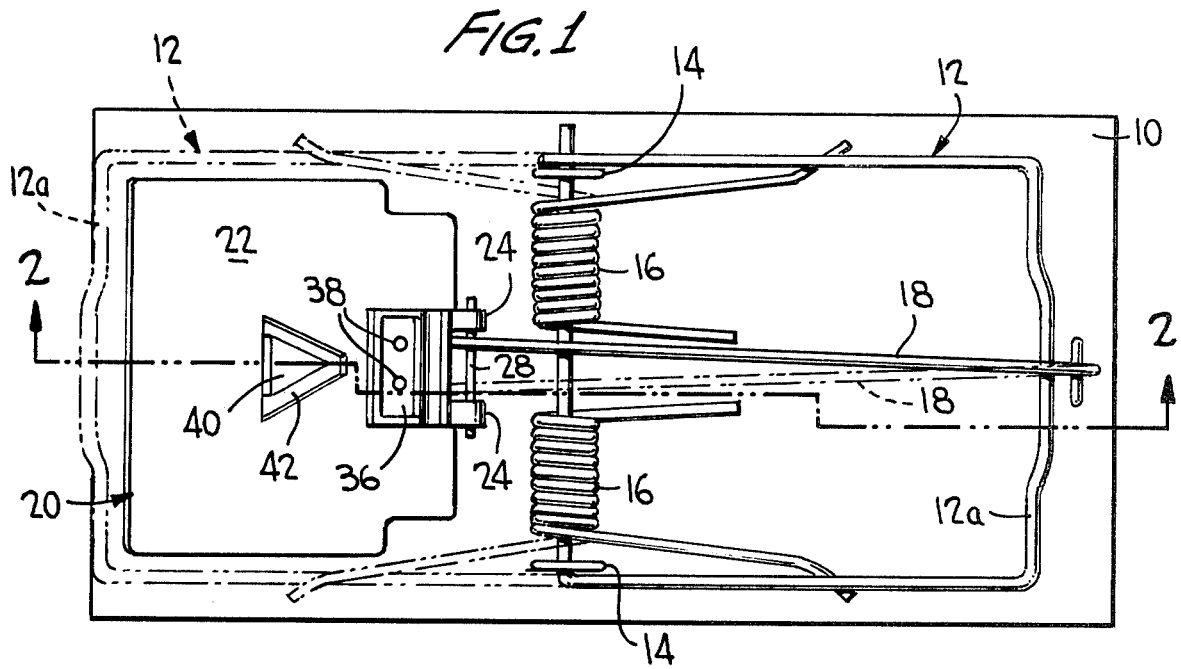
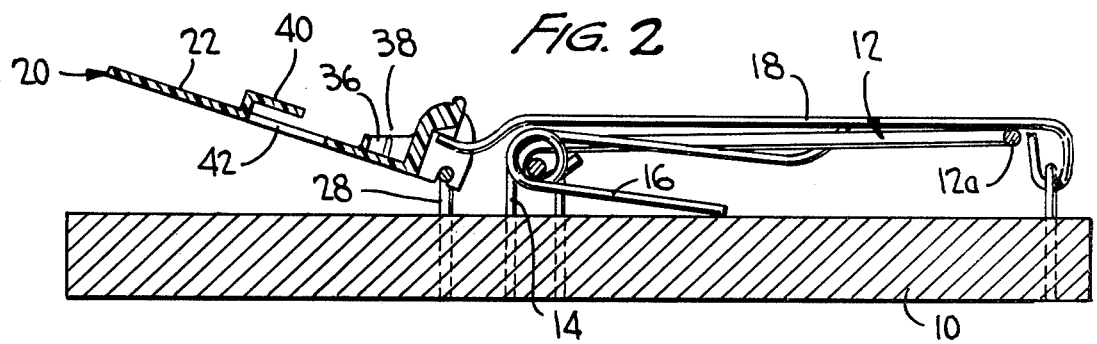
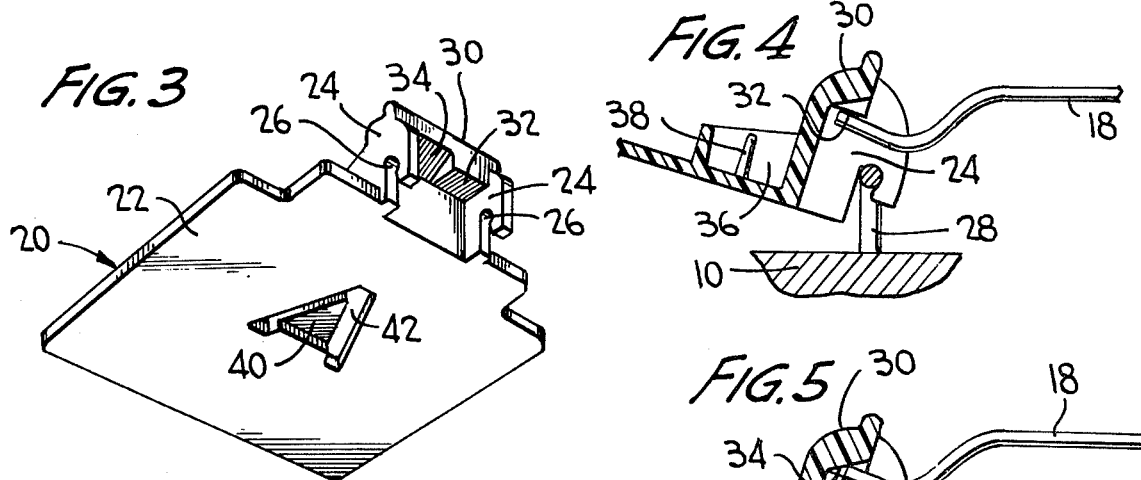
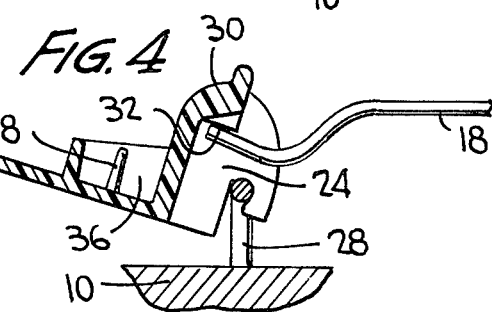
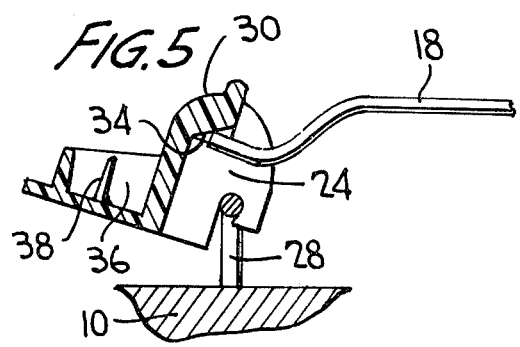

ANIMAL TRAP

BACKGROUND OF THE INVENTION

This invention relates to animal traps of the type generally used for individually trapping small rodents such as rats and mice and which comprise a generally U-shaped sprung jaw pivotally mounted at its free ends on a baseboard for swinging movement about a horizontal axis between set and sprung positions on opposite sides of the pivot axis respectively. A trigger arrangement for this type of trap generally takes the form of an elongated trigger arm or rod pivoted to one end of the baseboard and which extends when the trap is set over the cross bar of the depressed jaw and across the jaw pivot axis, with the free end of the arm releasably engaging a pivotal bait pedal on the opposite side of the jaw pivot axis. The bait pedal is generally centrally located with respect to the sprung position of the jaw and the arrangement is such that with the trap in a set condition, depression of the bait pedal by an animal releases the trigger arm allowing the jaw to swing over the under spring force and trap the animal against the baseboard.

Numerous forms of bail pedals have been used in prior art traps of the above type. One consideration in designing a bait pedal is that its bait retaining capacity should be correlated to its sensitivity to minimize the risk of an animal being able to remove the bait without springing the trap. Further, it is desirable for the pedal to have adequate coverage with respect to the overall area of the trap to maximize the catchment area of the trap. In the past, bait pedals have tended to be rather small compared with the enclosed area of the trap jaw. It is further desirable for the pedal to be designed to offer optimum sensitivity of release consistent with the size and weight of the animals to be trapped and with its bait retention characteristics.

With the above considerations in view, it is an object of the present invention to provide, for animals traps of the type described, a novel form of bait pedal which optimizes the use of a trap's catchment area.

It is a further object of the invention to provide a bait pedal which enables the sensitivity of a trap's trigger arrangement to be adjusted.

Another object of the invention is to provide a bait pedal having a novel form of bait retention means including a means for retaining a liquid or semiliquid bait.

A still further object of the invention is to provide a simple and convenient means for attaching a bait pedal to a trap baseboard.

SUMMARY OF THE INVENTION

A bait pedal in accordance with the invention is conveniently in the form of a plastic molding of generally planar form, preferably shaped to cover substantially the entire area enclosed by the trap jaw. At its forward end, i.e. the end adjacent the jaw pivot, the pedal has a snap-on arrangement whereby the pedal is pivoted to a staple mounted on the baseboard of the trap, the snap-on arrangement comprising a pair of laterally spaced vertical wall members projecting slightly forwardly of the pedal body and having snap-on recesses in the lower edges. The wall members extend upwardly of the pedal body and are connected by a horizontal wall whose undersurface forms an engagement surface for the forward end of the elongated trigger arm or rod of the trap. According to a preferred feature of the invention this engagement surface is laterally divided into separate sections affording different trigger settings for adjusting the sensitivity to springing of the trigger mechanism. To this end, one section of the engagement surface is made substantially parallel to the plane of the pedal body while another section of the engagement surface slopes longitudinally in ramp-like manner relative to the plane of the pedal body.

According to further features of the invention, the pedal carries on its upper surface a open-topped box-like arrangement for liquid and semi-liquid bait as well as attachment means, including an elevated claw, for solid bait.

Bait pedals in accordance with the invention can be conveniently and economically manufactured in plastic in a single molding operation and the snap-on fit simplifies assembly compared with existing designs. Further, the enlarged area of the pedal and its ability to provide an adjustment in the sensitivity of the trigger mechanism, enhance the versatility of traps equipped therewith.

A preferred embodiment of the invention will now be described by way of an example only with reference to the accompanying drawings.

DESCRIPTION OF DRAWINGS

FIG. 1 is a plan view of a rat trap with its jaw in the set position,

FIG. 2 is a sectional elevation of the trap along line 2—2 of FIG. 1,

FIG. 3 is an underneath perspective view of a bait pedal, and

FIGS. 4 and 5 are scrap views of parts of the trap trigger arrangement showing alternative settings.

DETAILED DESCRIPTION OF A PREFERRED EMBODIMENT

The illustrated rat trap includes in conventional manner, a wooden baseboard 10, a single substantially U-shaped jaw 12 pivoted at its free ends to staples 14 attached to the baseboard, coil springs 16 urging the jaw towards its sprung position and a trigger mechanism comprising an elongated trigger arm or rod 18 pivoted to the baseboard and which in the set position of the trap as illustrated, extends over the cross-bar 12a of the jaw with its free end releasably engaging a part of a pivotally mounted bait pedal 20.

It will be appreciated that the elements described above are conventional in this type of trap which operates in like manner to known traps such that the trap is sprung by depression of the bait pedal from the position illustrated. In accordance with the present invention the bait pedal has certain distinct features as will now be described.

The pedal 20, in the form of a one piece plastic molding, has a generally planar main body portion 22 of essentially rectangular form and a size and shape such that it substantially covers the entire area enclosed by jaw 12 when the jaw is in sprung position (shown dotted in FIG. 1). At its forward end, the pedal is formed with a pair laterally spaced upstanding wall members 24 with downwardly open recesses 26 which resiliently snap onto the cross-bar of a staple 28 attached to the baseboard whereby a pivotal mounting is provided for the pedal.

Integrally molded with and connecting the wall members 24 is an upper wall member 30, the undersurface of which forms the engagement surface for the free end of rod 18 and which undersurface comprises adjacent sections 32 and 34 providing different sensitivities to release of the trigger mechanism. Thus, section 32 of the engagement surface is aligned substantially in parallel with the plane of the main body portion of the pedal while section 34 is inclined with respect to the main body portion. As shown in FIGS. 4 and 5, the free end of rod 18 can be selectively engaged either with section 32 or with section 34 of the engagement surface when the trap is set and it will be appreciated from the geometry of the arrangement that the setting with rod 18 engaging section 32 offers greater resistence to springing of the trap than the alternative setting with rod 18 engaging section 34. This design of pedal thereby offers a simple manner in which alternative settings having differing degrees of sensitivity to release can be provided in a trap of this type.

Rearward extensions of the wall members 24 form sidewalls of an open-topped box-like receptacle 36 for the retention of liquid or semi-liquid bait and which includes a pair of upstanding prongs 38. The pedal is completed by further retention means for solid bait in the form of an upstanding claw 40 having a pointed section substantially parallel to the plane of the pedal and which is located over a suitably shaped opening 42 in the body of the pedal.

It will be appreciated from the above description that the invention provides an advantageous design of the bait pedal for traps of the type described which, conveniently, is in the form of a one-piece plastic molding, which further allows for a simplified snap-on type of assembly and which offers the facility of providing different sensitivity settings for springing of the trap. Further by covering substantially the entire area enclosed by the trap jaw, the pedal optimizes the catchment area of the trap.

While only a single preferred embodiment of the invention has been described in detail, it will be appreciated that the invention is not limited to the specific features disclosed herein. Numerous modifications can be made within the scope of the invention, as defined in the appended claims.

The embodiments of the invention in which an exclusive property or privilege is claimed are defined as follows:

1. In an animal trap comprising a substantially planar baseboard means, a generally U-shaped jaw member, means pivotally mounting free ends of said jaw member to said baseboard means about a pivot axis substantially parallel to the plane of said baseboard means, spring means operative between said baseboard means and said jaw member for urging said jaw member toward a sprung position in which a cross bar section of said member engages said baseboard means on one side of said pivot axis and trigger means for releasably maintaining said jaw in set position in opposition to said spring means, said cross bar section being disposed in said set position adjacent the baseboard means on the opposite side of said pivot axis, said trigger means comprising a rod pivotally mounted to said baseboard means on said opposite side to sais pivot axis and a bait pedal pivotally mounted to said baseboard means on said one side of said pivot axis, said rod extending in said set position over said cross bar section and across said pivot axis and the free end of said rod engaging an engagement surface of said bait pedal to retain the jaw member in set position whereby depression of the bait pedal releases the free end of said rod from said engagement surface to spring the trap, the improvement comprising adjustment means for providing different sensitivities for springing the trap in response to respective different levels of depression of the bait pedal, said adjustment means comprising separate sections of said engagement surface selectively engageable by the free end of said rod; wherein said bait pedal comprises a substantially planar main body portion, said engagement surface including a planar first section substantially parallel to said main body portion and a planar second section adjacent said first section and which is inclined with respect to said main body portion.

2. The improvement of claim 1, wherein said bait pedal includes a pair of laterally spaced wall members extending upwardly from a forward end section of said main body portion and an upper wall member connecting said laterally spaced wall members and having an undersurface defining said engagement surface.

3. An animal trap according to claim 1 wherein mounting means for said bait pedal comprises anchoring means attached to said baseboard means said anchoring means including a pivot bar above and substantially parallel to said baseboard means and upstanding wall means associated with said bait pedal and defining downwardly opening recess means providing a resilient snap-on pivotal connection with said pivot bar.

4. The improvement of claim 3, wherein said upstanding wall means comprises a pair of laterally spaced wall members and said pedal further including an upper wall member connecting said laterally spaced wall members and having an undersurface defining said engagement surface.

5. The improvement as defined in claim 1 or claim 3, wherein said bait pedal has a essentially planar main body portion of a size and shape substantially to cover the entire area enclosed by said jaw when the jaw is in the sprung condition.

6. The improvement as defined in claim 1 or claim 3, wherein said bait pedal has an essentially planar main body portion including first retention means for liquid and semi-liquid bait and second retention means for solid bait.

7. The improvement as defined in claim 6, wherein said first retention means is in the form of a box-like receptacle.

8. The improvement as claimed in claim 7, wherein said receptacle includes at least one upstanding prong member.

9. The improvement as claimed in claim 6, wherein said second retention means comprises a claw means projecting upwardly from said main body portion and including a pointed section lying in a plane substantially parallel to plane of said main body section.

* * * * *